(12) United States Patent
Ishida

(10) Patent No.: US 9,073,543 B2
(45) Date of Patent: Jul. 7, 2015

(54) CONTROL DEVICE OF VEHICLE DRIVE DEVICE

(75) Inventor: Ryuta Ishida, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 19 days.

(21) Appl. No.: 14/112,256

(22) PCT Filed: Apr. 21, 2011

(86) PCT No.: PCT/JP2011/059870
§ 371 (c)(1),
(2), (4) Date: Oct. 17, 2013

(87) PCT Pub. No.: WO2012/144056
PCT Pub. Date: Oct. 26, 2013

(65) Prior Publication Data
US 2014/0236406 A1 Aug. 21, 2014

(51) Int. Cl.
*G06F 7/00* (2006.01)
*B60W 20/00* (2006.01)
*B60W 10/02* (2006.01)
*B60W 10/06* (2006.01)
*B60W 10/30* (2006.01)
*F16D 48/06* (2006.01)
(Continued)

(52) U.S. Cl.
CPC ............ *B60W 20/10* (2013.01); *B60W 10/02* (2013.01); *B60W 10/06* (2013.01); *B60W 10/30* (2013.01); *B60W 20/00* (2013.01); *B60W 20/40* (2013.01); *B60W 2540/14* (2013.01); *B60Y 2400/71* (2013.01); *F16D 2048/0266* (2013.01); *F16D 2048/023* (2013.01); *F16D 48/066* (2013.01); *F16D 2500/1066* (2013.01); *F16D 2500/3024* (2013.01); *F16D 2500/3067* (2013.01); *F16D 2500/31413* (2013.01); *F16D 2500/31433* (2013.01); *F16D 2500/3144* (2013.01); *B60K 6/48* (2013.01); *B60K 2006/4825* (2013.01); *Y02T 10/6221* (2013.01); *Y02T 10/6252* (2013.01); *B60K 6/387* (2013.01); *B60K 6/547* (2013.01); *Y10S 903/946* (2013.01)

(58) Field of Classification Search
USPC ..................................................... 701/22, 55
See application file for complete search history.

(56) References Cited

U.S. PATENT DOCUMENTS

2007/0021260 A1* 1/2007 Nozaki et al. ................. 475/119
2007/0298932 A1* 12/2007 Yoneyama .................... 477/120
(Continued)

FOREIGN PATENT DOCUMENTS

DE 10 2008 053 391 A1 4/2010
JP U-5-30567 4/1993
(Continued)

*Primary Examiner* — Hussein A. Elchanti
(74) *Attorney, Agent, or Firm* — Oliff PLC

(57) ABSTRACT

The present invention provides a control device of a vehicle drive device having an engine that is a drive power source for running, a manual transmission receiving power of the engine via a clutch, an electric motor acting as a drive power source for running disposed on the downstream side of the clutch, a release cylinder releasing the clutch depending on a supply oil pressure, and a master cylinder supplying an oil pressure to the release cylinder in accordance with a depressing operation of a clutch pedal, a shut valve being disposed that is put into a closed state to interrupt a hydraulic path between the release cylinder and the master cylinder, and the shut valve being closed if the clutch is released by the depressing operation of the clutch pedal during driving of the engine.

5 Claims, 7 Drawing Sheets

(51) Int. Cl.
   *B60K 6/48*   (2007.10)
   *B60K 6/387*   (2007.10)
   *B60K 6/547*   (2007.10)
   *F16D 48/02*   (2006.01)

(56) References Cited

U.S. PATENT DOCUMENTS

| | | | |
|---|---|---|---|
| 2008/0167155 A1* | 7/2008 | Kawaguchi et al. | 475/119 |
| 2009/0017983 A1* | 1/2009 | Iwase et al. | 477/3 |
| 2010/0056334 A1* | 3/2010 | Toi et al. | 477/158 |
| 2010/0229969 A1* | 9/2010 | Ishikawa et al. | 137/511 |
| 2011/0056317 A1* | 3/2011 | Sato | 74/473.11 |
| 2011/0224878 A1* | 9/2011 | Nakamura et al. | 701/56 |
| 2011/0270483 A1* | 11/2011 | Endo et al. | 701/29 |
| 2012/0323456 A1* | 12/2012 | Kato et al. | 701/55 |
| 2013/0253786 A1* | 9/2013 | Saito et al. | 701/55 |

FOREIGN PATENT DOCUMENTS

| | | |
|---|---|---|
| JP | Y2-2586784 | 10/1998 |
| JP | A-2003-269207 | 9/2003 |
| JP | A-2008-144859 | 6/2008 |
| JP | 2009-056860 A | 3/2009 |
| JP | 2009-292315 A | 12/2009 |
| JP | A-2009-292419 | 12/2009 |

* cited by examiner

CONTROL DEVICE OF VEHICLE DRIVE DEVICE

TECHNICAL FIELD

The present invention relates to a control device of a vehicle drive device preferably used in a hybrid vehicle and particularly to control of a clutch interposed between an engine and a manual transmission.

BACKGROUND ART

A control device of a vehicle drive device is conventionally known that includes an engine and an electric motor acting as drive power sources for running, a manual transmission receiving power of the engine via a clutch and outputting power to drive wheels, a release cylinder releasing the clutch depending on a supply oil pressure, and a master cylinder supplying an oil pressure to the release cylinder in accordance with a depressing operation of a clutch pedal. For example, a driving control device for a vehicle of Patent Document 1 is an example thereof. The vehicle of Patent Document 1 includes a hydraulic supply source made up of an oil pump, an electromagnetic valve, etc. The release cylinder is supplied with an oil pressure from the hydraulic supply source separately from the master cylinder. Therefore, the drive control device can supply an oil pressure from the hydraulic supply source to the release cylinder to automatically release the clutch, thereby disconnecting the engine from the drive wheels. For example, by disconnecting the engine from the drive wheels, the engine can be stopped and the power of the electric motor can be used for the vehicle running while the stopped state of the engine is maintained.

PRIOR ART DOCUMENTS

Patent Documents

Patent Document 1: Japanese Laid-Open Patent Publication No. 2009-292419
Patent Document 2: Japanese Laid-Open Patent Publication No. 2003-269207
Patent Document 3: Japanese Laid-Open Patent Publication No. 2008-144859
Patent Document 4: Japanese Utility Model Application Publication No. 5-30567
Patent Document 5: Japanese Utility Model Registration Publication No. 2586784

SUMMARY OF THE INVENTION

Problem to Be Solved by the Invention

In the configuration of the vehicle disclosed in Patent Document 1, the power of the electric motor can be used for the vehicle running while the stopped state of the engine is maintained; however, the configuration has a problem that the hydraulic supply source must be provided. Conversely, the configuration has a problem that if the hydraulic supply source is not included in the vehicle disclosed in Patent Document 1, a release of a depressing operation of a clutch pedal by a driver leads to the engagement of the clutch, which makes the vehicle unable to continue running while the stopped state of the engine is maintained. Such a problem is not known.

The present invention was conceived in view of the situations and it is therefore an object of the present invention to provide, in a hybrid vehicle including an engine and an electric motor acting as drive power sources for running and a manual transmission, a control device of a vehicle drive device enabling EV running in which power of the electric motor is used for running with the engine stopped without the need for a hydraulic supply source including an oil pump etc., for releasing the clutch.

Means for Solving the Problems

To achieve the object, the first aspect of the invention provides (a) a control device of a vehicle drive device having an engine that is a drive power source for running, a manual transmission receiving power of the engine via a clutch, an electric motor acting as a drive power source for running disposed on the downstream side of the clutch, a release cylinder releasing the clutch depending on a supply oil pressure, and a master cylinder supplying an oil pressure to the release cylinder in accordance with a depressing operation of a clutch pedal, wherein (b) a shut valve is disposed that is put into a closed state to interrupt a hydraulic path between the release cylinder and the master cylinder, and wherein (c) the shut valve is closed if the clutch is released by the depressing operation of the clutch pedal during driving of the engine.

Effects of the Invention

Consequently, the closing of the shut valve retains the oil pressure in the release cylinder supplied by the depressing operation of the clutch pedal even when the depressing operation of the clutch pedal is canceled and, thus, the control device can retain the release state of the clutch and can automatically stop the engine. Therefore, after the automatic stop of the engine, the EV running can be performed by using the power of the electric motor for running with the engine stopped. Since the oil pressure in the release cylinder retaining the release state of the clutch at the time of closing of the shut valve is supplied to the release cylinder by the depressing operation of the clutch pedal, it is advantageous that, for example, a hydraulic supply source including an oil pump etc., is not necessary for releasing the clutch.

The second aspect of the invention provides the control device of a vehicle drive device recited in the first aspect of the invention, wherein during EV running in which power of the electric motor is used for running with the engine stopped, if the engine is started, the shut valve is opened to allow the clutch to slip. Consequently, the power from the manual transmission side can be appropriately transmitted to the engine by adjusting an opening degree of the shut valve and the engine can be cranked with the power from the manual transmission side to start the engine. Therefore, the running state of the vehicle can be shifted from the EV running to HV running in which the engine or the engine and the electric motor is/are used for the vehicle running.

The third aspect of the invention provides the control device of a vehicle drive device recited in the first or second aspect of the invention, wherein if the clutch is released by the depressing operation of the clutch pedal during driving of the engine, the shut valve is closed when a vehicle stops, while the shut valve is kept open when the running of the vehicle is continued. Consequently, when the running of the vehicle is continued, the clutch is released in conjunction with the depressing operation of the clutch pedal and, therefore, a driver can perform a manual shift operation of the manual transmission accompanied by the depressing operation of the clutch pedal.

The fourth aspect of the invention provides the control device of a vehicle drive device recited in any one of the first to third aspects of the invention, wherein (a) if the shut valve is closed, the engine is stopped, and wherein (b) if a depressing operation of an accelerator pedal is performed during stop of the engine, the EV running is performed in which power of the electric motor is used for running with the engine stopped. Consequently, the EV running is performed at the start of the vehicle and, thus, the fuel efficiency of the vehicle is improved. For example, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Conversely, reduction in fuel efficiency refers to shortening of the running distance per unit fuel consumption or increase in fuel consumption rate of the vehicle as a whole.

The fifth aspect of the invention provides the control device of a vehicle drive device recited in any one of the first to fourth aspects of the invention, wherein (a) the master cylinder generates an oil pressure when a piston pressing member interposed between a piston included in the master cylinder and the clutch pedal presses the piston in an axial direction, wherein (b) the piston pressing member is disposed to be movable relative to the piston from a position of pressing the piston, to a side away from the piston, and wherein (c) the clutch pedal is biased in a return direction of the clutch pedal. Consequently, even when the shut valve is closed with the clutch released and, as a result, the piston of the master cylinder is retained at the position when the clutch pedal is subjected to the depressing operation, the clutch pedal returns to the position before the depression if a driver stops the depressing operation of the clutch pedal. Therefore, an uncomfortable feeling given to the driver can be avoided such as those generated when the clutch pedal does not return to the position before the depression due to the closing of the shut valve.

Preferably, (a) if a brake pedal is depressed and a vehicle speed is equal to or less than a predetermined stop determination vehicle speed, it is determined that the vehicle is to be stopped, and (b) if the clutch is released by the depressing operation of the clutch pedal during driving of the engine, the shut valve is closed when it is determined that the vehicle is to be stopped.

Preferably, when the shut valve is opened, it is determined that the clutch is released by the depressing operation of the clutch pedal if a stroke amount of the release cylinder exceeds a predetermined stroke amount determination value or if the oil pressure in the release cylinder exceeds a predetermined release cylinder oil pressure determination value.

Preferably, the oil pressure in the release cylinder is retained by closing the shut valve.

Preferably, if a charge remaining amount of an electric storage device capable of giving/receiving electric power to/from the electric motor is less than a predetermined charging remaining amount lower limit value, the engine is activated.

MODE FOR CARRYING OUT THE INVENTION

An example of the present invention will now be described in detail with reference to the drawings.

EXAMPLE

Figure 1:
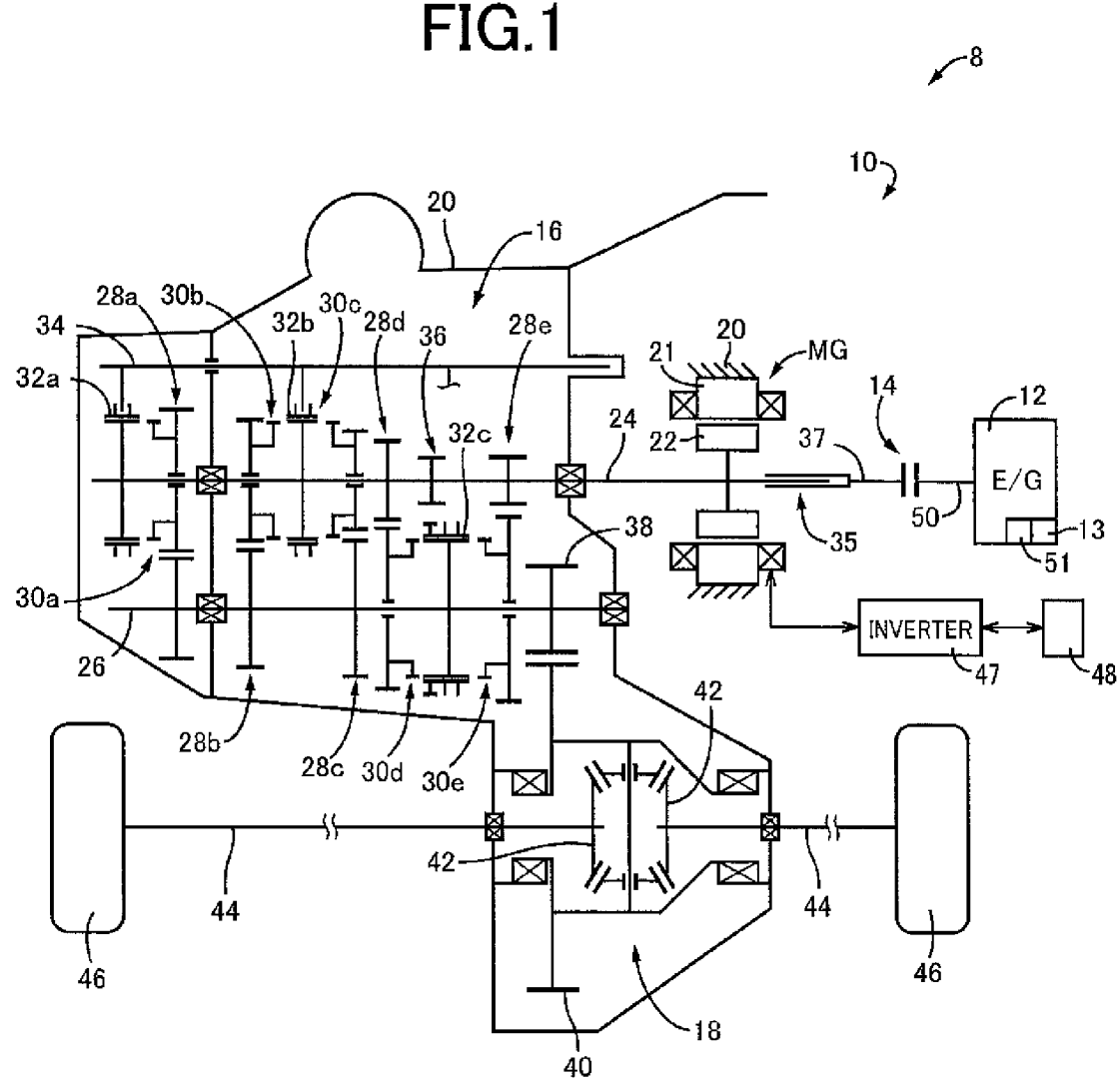
FIG. 1 is a schematic for explaining a general configuration of a vehicle drive device included in a hybrid vehicle that is an example of the present invention.

FIG. 1 is a schematic for explaining a general configuration of a vehicle drive device 10 included in a hybrid vehicle 8 (hereinafter referred to as a vehicle 8) that is an example of the present invention. As depicted in FIG. 1, the vehicle 8 includes the vehicle drive device 10 (hereinafter referred to as a drive device 10), a pair of left and right drive axles (drive shafts) 44, a pair of left and right drive wheels 46, an inverter 47, an electric storage device 48, and an electronic control device 84. The drive device 10 includes an engine 12 and an electric motor MG functioning as drive power sources for running, a clutch 14, a vehicle manual transmission 16 (hereinafter referred to as a manual transmission 16), a differential gear device 18 acting as a final reduction gear, and a housing 20 that is a housing acting as a non-rotating member housing the clutch 14, the manual transmission 16, the differential gear device 18, and the electric motor MG. The vehicle 8 is configured such that drive power generated by the engine 12 and the electric motor MG is transmitted sequentially through the manual transmission 16, the differential gear device 18, and the pair of the left and right drive axles 44 to the pair of the left and right drive wheels 46. Because of such a configuration, the vehicle 8 is driven by using at least one of the engine 12 and the electric motor MG as a drive source for running. Therefore, the vehicle 8 selectively establishes either of EV running (motor running) in which only power of the electric motor MG is used for the vehicle running with the engine 12 stopped and HV running (hybrid running) in which power of the engine 12 or power of the engine 12 and the electric motor MG is used for the vehicle running.

The engine 12 is an internal combustion engine such as cylinder-injection gasoline and diesel engines in which fuel is directly injected into a combustion chamber, for example. To control the drive (output torque) of the engine 12, the engine 12 is disposed with an output control device 13 including a throttle actuator providing opening/closing control of an electronic throttle valve 96, a fuel injection device providing fuel injection control, and an ignition device providing ignition timing control. The output control device 13 controls the opening/closing of the electronic throttle valve with the throttle actuator for throttle control in accordance with instructions supplied from the electronic control device 84, controls fuel injection by the fuel injection device for the fuel injection control, and controls timing of ignition by the ignition device for the ignition timing control, thereby providing output control of the engine 12. The engine 12 includes a starter motor 51 for engine start. Therefore, although the engine 12 is cranked by one or both of reverse drive power transmitted from the drive wheels 46 and the drive power of the electric motor MG at the time of engine start, the engine 12 is also cranked by the starter motor 51 instead.

The electric motor MG is, for example, a three-phase synchronous electric motor, is a motor generator having a function of an electric motor (motor) generating the drive power and a function of a generator (electric generator) generating a reaction force, and at least has the function of a motor. A stator 21 of the electric motor MG is fixed to the housing 20 and a rotor 22 is relatively non-rotatably coupled to a transmission input shaft 24 that is an input shaft of the manual transmission 16. A power transmission path between the engine 12 and the electric motor MG is disposed with the clutch 14 generating a transmission torque capacity corresponding to an engagement state. In other words, the electric motor MG is disposed on the downstream side of the clutch 14 in the power transmission path from the engine 12 to the drive wheels 46. Therefore, the electric motor MG is coupled to the power transmission path between the clutch 14 and the drive wheels 46. In short, a crankshaft 50 acting as an output member of the engine 12 is selectively coupled via the clutch 14 to the rotor 22 of the electric motor MG and the transmission input shaft 24.

The electric motor MG configured as described above is connected via the inverter 47 depicted in FIG. 1 to the electric storage device 48 such as a battery and a capacitor in a manner capable of giving/receiving electric power and, when the inverter 47 is controlled by the electronic control device 84, a drive current supplied to coils of the stator 21 is adjusted and, as a result, the drive of the electric motor MG is controlled. In other words, when the inverter 47 is controlled by the electronic control device 84, an output torque Tmg of the electric motor MG (hereinafter referred to as an electric motor torque Tmg) is increased/decreased. Although the electric motor torque Tmg is output only to the manual transmission 16 during release (non-engagement) of the clutch 14, while the clutch 14 is engaged, for example, when the engine 12 is cranked during the EV running, a portion of the electric motor torque Tmg is output to the manual transmission 16 and the other portion is output to the engine 12. With regard to the electric motor torque Tmg and an engine torque Te, a positive direction is a direction coincident with the rotation direction of the engine 12, i.e., a direction of driving of the drive wheels 46. On the other hand, a negative direction is a direction of braking of the drive wheels 46.

The manual transmission 16 is disposed in the common housing 20 along with the differential gear device 18 to make up a transaxle and is immersed in a predetermined amount of lubrication oil filled in the housing 20 so as to be lubricated along with the differential gear device 18. The manual transmission 16 receives the power of the engine 12 via the clutch 14 and directly receives the power of the electric motor MG without through the clutch 14. The manual transmission 16 is a parallel-shaft-type constant-mesh shifting mechanism having five forward speeds manually established by shift operation of a driver. The manual transmission 16 includes the transmission input shaft 24, a transmission output shaft 26 that is an output shaft of the manual transmission 16, a plurality of constant-mesh change gear pairs 28a to 28e having gear ratios different from each other, a plurality of meshing clutches 30a to 30e disposed respectively for the change gear pairs 28a to 28e, and a shift select shaft 34. The transmission input shaft 24 and the transmission output shaft 26 form a pair of shafts parallel to each other and each of the plurality of the change gear pairs 28a to 28e is disposed between the transmission input shaft 24 and the transmission output shaft 26 forming a pair. The shift select shaft 34 selectively moves any of three clutch hub sleeves 32a, 32b, and 32c of the meshing clutches 30a to 30e in conjunction with the shift operation of a driver, thereby switching shift stages (gear stages) of the manual transmission 16. The transmission input shaft 24 and the transmission output shaft 26 are also disposed with a reverse gear pair 36 and a reverse shift stage is established by engagement with a reverse idle gear disposed on a counter shaft not depicted. A clutch output shaft 37 of the clutch 14 is relatively non-rotatably coupled to the transmission input shaft 24 by a spline portion 35. The transmission output shaft 26 is disposed with an output gear 38 and the output gear 38 is meshed with a ring gear 40 of the differential gear device 18. FIG. 1 is a development view with the respective axial centers of the transmission input shaft 24, the transmission output shaft 26, and the ring gear 40 depicted in a common plane.

Each of the meshing clutches 30a to 30e is a constant-mesh type synchromesh clutch and any of the meshing clutches 30a to 30e is/are engaged by the shift select shaft 34 to change a gear ratio rotation speed Nin of the transmission input shaft 24/rotation speed Nout of the transmission output shaft 26) of the manual transmission 16 in a stepwise manner. Specifically, the engagement of the meshing clutch 30e establishes a first shift stage (1st) having a largest gear ratio γ of the manual transmission 16. The engagement of the meshing clutch 30d establishes a second shift stage (2nd) having a second largest gear ratio γ. The engagement of the meshing clutch 30c establishes a third shift stage (3rd) having a third largest gear ratio γ. The engagement of the meshing clutch 30b establishes a fourth shift stage (4th) having a fourth largest gear ratio γ. The engagement of the meshing clutch 30a establishes a fifth shift stage (5th) having a smallest gear ratio γ.

The differential gear device 18 is of a bevel-gear type and a pair of side gears 42 depicted in FIG. 1 is respectively coupled to a pair of the drive axles 44 by spline fitting etc., to rotationally drive the left and right front wheels (drive wheels) 46.

Figure 2:
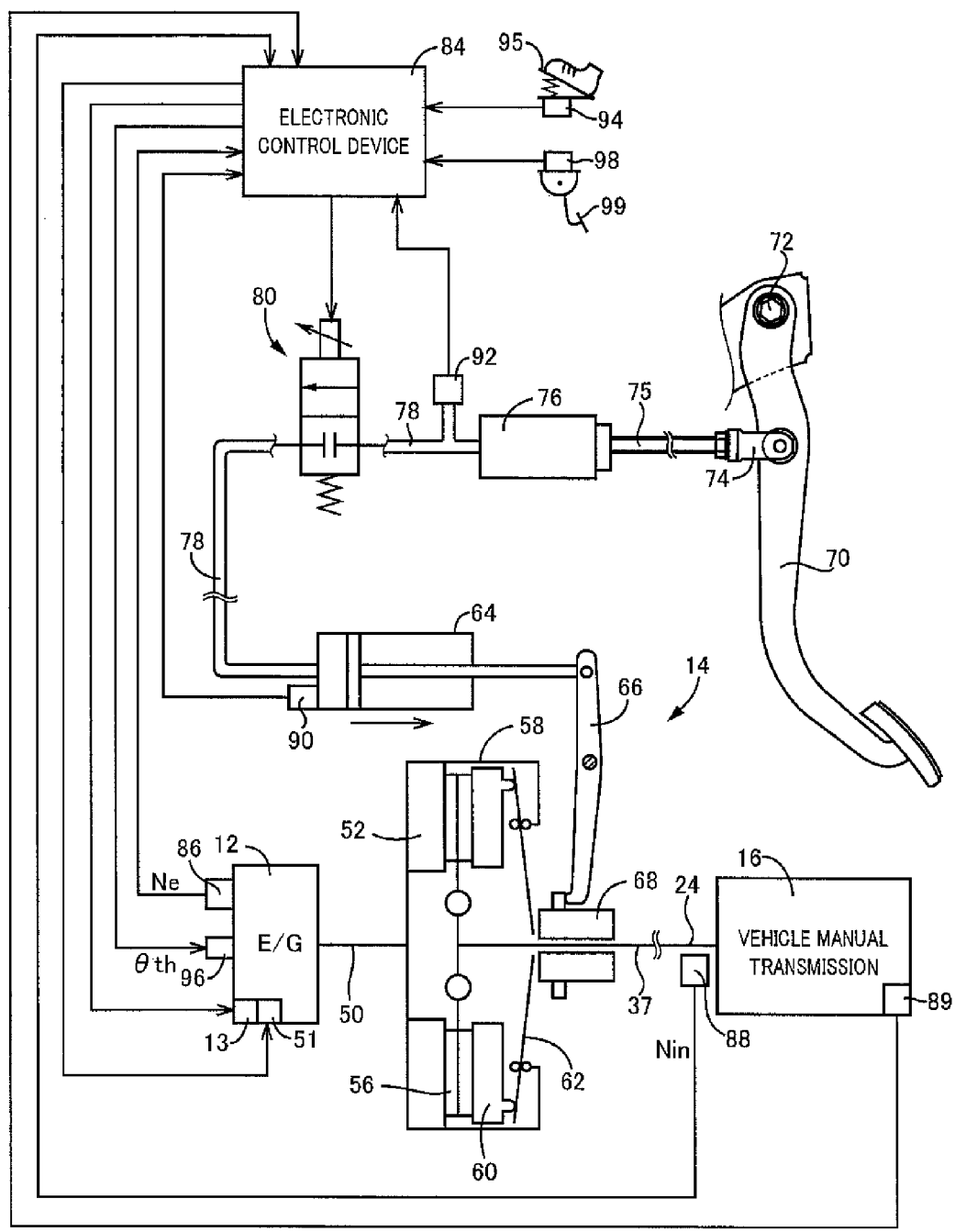
FIG. 2 is a diagram schematically depicting a general structure of the clutch included in the vehicle drive device of FIG. 1 and a mechanism for engaging and releasing the clutch in accordance with a clutch pedal operation of a driver.

FIG. 2 schematically depicts a general structure of the clutch 14 of FIG. 1 and a mechanism for engaging and releasing the clutch 14 in accordance with a clutch pedal operation of a driver. The clutch 14 has a flywheel 52 attached to the crankshaft 50 of the engine 12; a clutch disc 56 disposed on the clutch output shaft 37; a pressure plate 60 disposed on a clutch housing 58; a diaphragm spring 62 biasing the pressure plate 60 toward the flywheel 52 to clamp the clutch disc 56 for transmitting power; a clutch release cylinder 64 acting as a clutch actuator releasing the clutch 14 depending on a supply oil pressure; and a release sleeve 68 moved via a release fork 66 by the clutch release cylinder 64 toward the flywheel 52 (to the left side of FIG. 2) so as to displace an inner end portion of the diaphragm spring 62 toward the flywheel 52 (to the left side of FIG. 2) to release (interrupt) the clutch 14.

When a driver depresses a clutch pedal 70, the clutch pedal 70 is rotated around a supporting point 72 to move a pushrod 75 via a clevis 74 in an axial direction, supplying oil in a clutch master cylinder 76 through a pipe 78 to the clutch release cylinder 64. In short, the depressing operation of the clutch pedal 70 causes the clutch master cylinder 76 to supply an oil pressure to the clutch release cylinder 64 via the pipe 78. The oil supplied through the pipe 78 to the clutch release cylinder 64 moves a piston in the clutch release cylinder 64 and causes the release sleeve 68 via the release fork 66 to press the diaphragm spring 62, thereby releasing the clutch 14. When the depression of the clutch pedal 70 is canceled, the oil moves toward the clutch master cylinder 76.

The pipe 78 making up a hydraulic path between the clutch master cylinder 76 and the clutch release cylinder 64 is disposed with a shut valve 80 selectively blocking the hydraulic path made up of the pipe 78. The shut valve 80 is put into a closed state to block the hydraulic path and is a constantly-closed (normally-closed) solenoid valve put into the closed state while a solenoid included in the shut valve 80 is in a non-excited state. The shut valve 80 can continuously vary an opening degree of the shut valve 80, i.e., a shut valve opening degree OPsht, depending on a drive current of the shut valve 80 from 0% corresponding to the closed state of the shut valve 80, to 100% corresponding to the completely opened state of the shut valve 80. In other words, the shut valve opening degree OPsht is controlled based on an instruction of the electronic control device 84. For example, if the shut valve 80 is switched from the opened state to the closed state, a flow of the oil in the pipe 78 is blocked and, therefore, an oil pressure Prc in the clutch release cylinder 64 (hereinafter referred to as a release cylinder oil pressure Prc) and an oil pressure Pmc in the clutch master cylinder 76 (hereinafter referred to as a master cylinder oil pressure Pmc) at the time of switch are retained as they are. In a further example, if the clutch pedal 70 is depressed by a driver while the shut valve 80 is in the completely opened state, the clutch 14 is released and, if the shut valve 80 is switched from the opened state to the closed state when the clutch 14 is released, the release cylinder oil pressure Prc is retained and the release state of the clutch 14 is maintained even after the cancelation of the depressing operation of the clutch pedal 70. After the cancelation of the depressing operation of the clutch pedal 70, for example, the electronic control device 84 can progressively increase the shut valve opening degree OPsht from 0% to gradually reduce the release cylinder oil pressure Prc, thereby changing the release state of the clutch 14 to a slip state (half-clutch state) corresponding to the release cylinder oil pressure Prc and subsequently to an engaged state.

Figure 3:
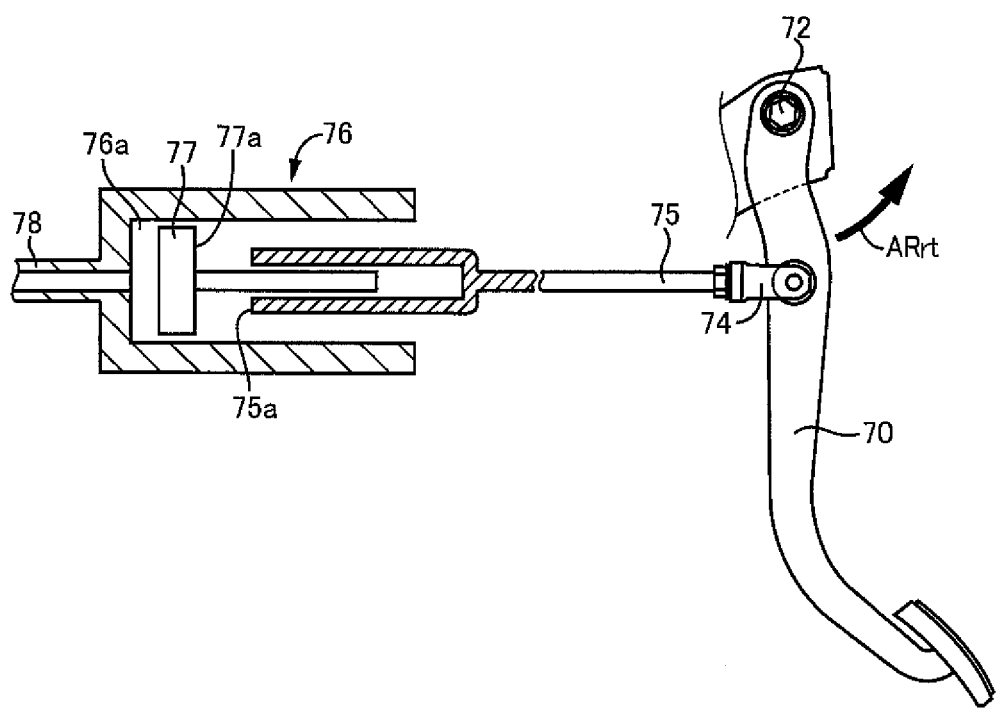
FIG. 3 is a diagram for explaining a coupling relationship via a pushrod between the clutch pedal and a piston included in a clutch master cylinder in the structure of the clutch depicted in FIG. 2, and a diagram in which the vicinity of the clutch master cylinder is schematically depicted in a cross-sectional view.

FIG. 3 is a diagram for explaining a coupling relationship via the pushrod 75 between the clutch pedal 70 and a piston 77 included in the clutch master cylinder 76, and the vicinity of the clutch master cylinder 76 is schematically depicted in a cross-sectional view. The pushrod 75 is movably disposed relative to the piston 77 in axial direction of the clutch master cylinder 76. The pushrod 75 is coupled at one end to the clutch pedal 70 via the clevis 74 and the other end has a pressing surface 75a making up the other end facing a back surface 77a of the piston 77. Therefore, the pushrod 75 is disposed to be movable relative to the piston 77 from the position of pressing the piston 77, to the side away from the piston 77. Thus, for example, if the clutch pedal 70 is depressed, the pressing surface 75a of the pushrod 75 comes into contact with the back surface 77a of the piston 77 and the pushrod 75 presses the piston 77 in the direction of compressing the oil in an oil chamber 76a of the clutch master cylinder 76. As described above, the pushrod 75 acts as a piston pressing member interposed between the piston 77 and the clutch pedal 70. When the piston 77 is pressed by the pushrod 75 in the axial direction, the clutch master cylinder 76 generates an oil pressure. Since the clutch pedal 70 is biased in the return direction of the clutch pedal 70 (direction of an arrow ARrt of FIG. 3) by a spring mechanism etc., if the driver releases the clutch pedal 70, the clutch pedal 70 returns to a predetermined pedal initial position before depression without being bound to the position of the piston 77. For example, while the clutch pedal 70 is depressed, if the shut valve 80 is closed and the master cylinder oil pressure Pmc is retained, a subsequent release of the depressing operation of the clutch pedal 70 does not change the position of the piston 77; however, the pressing surface 75a of the pushrod 75 separates from the back surface 77a of the piston 77 and the clutch pedal 70 returns to the pedal initial position.

Returning to FIG. 2, the electronic control device 84 includes a microcomputer and executes signal processes in accordance with programs stored in advance in a ROM while utilizing a temporary storage function of a RAM. The electronic control device 84 is supplied with a signal indicative of an engine rotation speed Ne from an engine rotation speed sensor 86; a signal indicative of the rotation speed Nin (input shaft rotation speed Nin) of the transmission input shaft 24 from an input shaft rotation speed sensor 88; a signal indicative of the rotation speed Nout (output shaft rotation speed Nout) of the transmission output shaft 26 from an output shaft rotation speed sensor 89; a signal indicative of a piston position of the clutch release cylinder 64, i.e., a stroke amount STKrc, from a stroke position sensor 90; a signal indicative of the master cylinder oil pressure Pmc from a master cylinder oil pressure sensor 92; a signal indicative of a depression amount of an accelerator pedal 95, i.e., an accelerator opening degree Acc, from an accelerator opening degree sensor 94; and a signal indicative of an operation state of a foot brake pedal 99, i.e., brake-on or brake-off, from a brake switch 98. The electronic control device 84 is also supplied with a signal indicative of a charge remaining amount SOC of the electric storage device 48 from the electric storage device 48; a signal indicative of a throttle valve opening degree θth from a throttle valve opening degree sensor; a signal indicative of an intake air amount Q from an intake air amount sensor; a signal indicative of an engine water temperature from an engine cooling water temperature sensor; a signal indicative of a shift lever position from a lever position sensor, etc. Since the output shaft rotation speed Nout corresponds to a vehicle speed V, the output shaft rotation speed sensor 89 also acts as a vehicle speed sensor.

The electronic control device 84 controls a fuel injection amount and injection timing of a fuel injection valve, controls ignition timing of an ignition plug, and provides opening/closing control of the opening degree θth of the electronic throttle valve 96 with the throttle actuator such as an electric motor in accordance with the signals, thereby controlling an output state of the engine 12. The electronic control device 84 controls the shut valve 80 to selectively block the hydraulic path between the clutch master cylinder 76 and the clutch release cylinder 64.

In the vehicle 8 of this example, basically, when the vehicle 8 is stopped by a brake operation of a driver during the HV running, engine stop control for stopping the engine 12 is provided and, when the brake operation is subsequently canceled and the vehicle 8 starts, the EV running is performed with the engine 12 remaining stopped. During the EV running, if a predetermined condition is satisfied by an increase in the vehicle speed V etc., the EV running is switched to the HV running and, at the time of switch from the EV running to the HV running, engine start control for staring the engine 12 is provided. The control of stopping or starting the engine 12 in this way will hereinafter be described.

Figure 4:
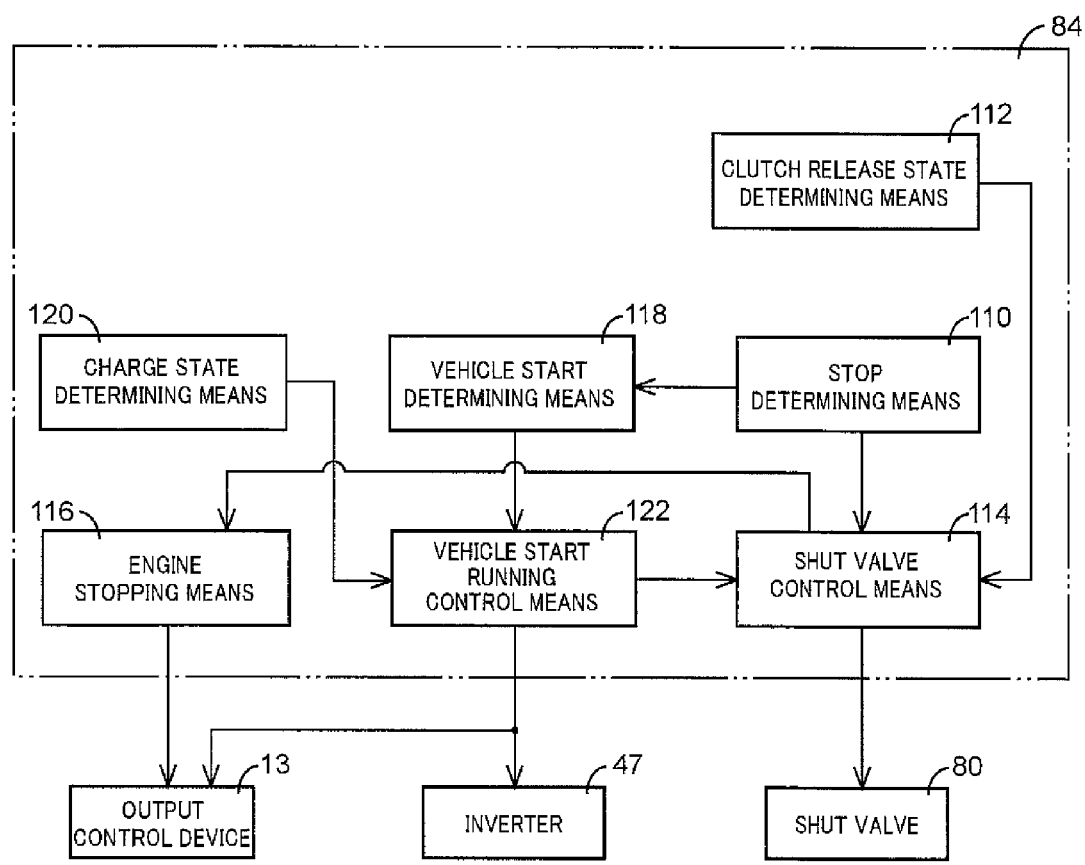
FIG. 4 is a functional block diagram for explaining a main portion of a control function included in an electronic control device of FIG. 2.

FIG. 4 is a functional block diagram for explaining a main portion of a control function included in the electronic control device 84. As depicted in FIG. 4, the electronic control device 84 includes a stop determining means 110, a clutch release state determining means 112, a shut valve control means 114, an engine stopping means 116, a vehicle start determining means 118, a charge state determining means 120, and a vehicle start running control means 122.

The stop determining means 110 sequentially determines whether the running vehicle 8 is to be stopped, in other words, a driver attempts to stop the vehicle 8. Specifically, the stop determining means 110 determines whether the foot brake pedal 99 is depressed by a driver, i.e., brake-on is achieved, and whether the vehicle speed V is equal to or less than a predetermined stop determination vehicle speed V0. If the operation state of the foot brake pedal 99 is the brake-on and the vehicle speed V is equal to or less than the stop determination vehicle speed V0, the stop determining means 110 determines that the vehicle 8 is to be stopped. The stop determination vehicle speed V0 is the vehicle speed V empirically determined in advance so as to certainly determine that the vehicle 8 comes to stop if accompanied by the brake-on, and is, for example, the vehicle speed V larger than zero that is substantially zero. The stop determination vehicle speed V0 may be zero and, in such a case, the stop determining means 110 determines whether the driver has stopped the vehicle 8.

The clutch release state determining means 112 sequentially determines whether the clutch 14 is completely released, i.e., whether the clutch 14 is in a completely released state. Specifically, the clutch release state determining means 112 determines whether a predetermined stroke amount determination value STK1rc is exceeded by a stroke amount STKrc from a predetermined reference stroke position of the clutch release cylinder 64 in the direction of releasing the clutch 14 (hereinafter referred to as a release cylinder stroke amount STKrc) when the shut valve 80 is completely opened. If the stroke amount determination value STK1rc is exceeded by the release cylinder stroke amount STKrc, the clutch release state determining means 112 determines that the clutch 14 is completely released. The release cylinder stroke amount STKrc is acquired based on the signal from the stroke position sensor 90. The stroke amount determination value STK1rc is a setting value empirically determined in advance so as to determine that the clutch 14 is in the completely released state based on the release cylinder stroke amount STKrc. When the stop determining means 110 determines that the vehicle 8 is to be stopped, if the clutch release state determining means 112 determines that the clutch 14 is completely released, it can be said that the clutch 14 is released by the driver in preparation for stopping. In the vehicle 8 including the manual transmission 16, the driver depresses the clutch pedal 70 to release the clutch 14 in preparation for stopping as a common vehicle operation. The reference stroke position of the clutch release cylinder 64 is a stroke end in the direction of engaging the clutch 14, for example.

The shut valve control means 114 adjusts the drive current of the shut valve 80 to provide opening/closing control of the shut valve 80. For example, during driving of the engine 12, if the stop determining means 110 determines that the vehicle 8 is to be stopped and the clutch release state determining means 112 determines that the clutch 14 is completely released, the shut valve control means 114 switches the shut valve 80 from the opened state to the closed state. Therefore, if the clutch 14 is released by the depressing operation of the clutch pedal 70 during driving of the engine, the shut valve control means 114 closes the shut valve 80 when the vehicle 8 stops. As a result, the release cylinder oil pressure Prc completely releasing the clutch 14 is retained and the completely released state of the clutch 14 is maintained. On the other hand, if the stop determining means 110 does not determine that the vehicle 8 is to be stopped, it is considered that the running of the vehicle 8 is still to be continued. Therefore, if it is not determined that the vehicle 8 is to be stopped as described above, the shut valve control means 114 maintains the shut valve 80 in the opened state even when the clutch release state determining means 112 determines that the clutch 14 is completely released. In other words, if the clutch 14 is released by the depressing operation of the clutch pedal 70 during driving of the engine, the shut valve control means 114 keeps the shut valve 80 open when the running of the vehicle 8 is continued.

The engine stopping means 116 stops the engine 12 when the vehicle 8 stops. Specifically, if the shut valve control means 114 switches the shut valve 80 from the opened state to the closed state, the engine stopping means 116 performs a fuel cut for the engine 12 to stop the engine 12 during driving of the engine 12.

The vehicle start determining means 118 sequentially determines whether a start operation of the vehicle 8 is performed in a stopped state while the vehicle 8 is stopped. In particular, after the stop determining means 110 determines that the vehicle 8 is to be stopped, the vehicle start determining means 118 determines whether the accelerator pedal 95 is depressed, based on the signal from the accelerator opening degree sensor 94. For example, if the accelerator opening degree Acc exceeds a vehicle start determination value empirically determined in advance so as to certainly detect the depressing operation of the accelerator pedal 95 with a detection error of the accelerator opening degree Acc excluded, the vehicle start determining means 118 determines that the accelerator pedal 95 is depressed. If it is determined that the accelerator pedal 95 is depressed, the vehicle start determining means 118 determines that the start operation of the vehicle 8 is performed.

The charge state determining means 120 sequentially determines whether the charge remaining amount SOC of the electric storage device 48 is insufficient. Specifically, the charge state determining means 120 determines whether the charge remaining amount SOC is less than a predetermined charge remaining amount lower limit value LOsoc. The charge remaining amount lower limit value LOsoc is empirically determined in advance so as to avoid limitation of the EV running as far as possible and not to reduce a charge/discharge performance of the electric storage device 48.

The vehicle start running control means 122 provides drive control of the engine 12 and the electric motor MG in relation to the start of the vehicle 8 and the vehicle running after the start. Specifically, if the vehicle start determining means 118 determines that the start operation of the vehicle 8 is performed during stop of the engine 12, the vehicle start running control means 122 starts the vehicle 8 in the EV running without starting the engine 12 and causes the electric motor MG to output the electric motor torque Tmg corresponding to the accelerator opening degree Acc for performing the EV running. Therefore, when starting the vehicle, if the depressing operation of the accelerator pedal 95 is performed during stop of the engine 12, the vehicle start running control means 122 performs the EV running while maintaining the stopped state of the engine 12. However, the vehicle start running control means 122 performs the EV running on the condition that the charge state determining means 120 determines that the charge remaining amount SOC of the electric storage device 48 is equal to or greater than the charge remaining amount lower limit value LOsoc. Therefore, if the charge state determining means 120 determines that the charge remaining amount SOC is less than the charge remaining amount lower limit value LOsoc, when the depressing operation of the accelerator pedal 95 is performed during stop of the engine 12, the vehicle start running control means 122 cranks and starts (activates) the engine 12 with the starter motor 51. After the start of the engine, the vehicle 8 is started in the HV running depending on the accelerator opening degree Acc and the HV running is performed.

If the EV running is started, after the start of the EV running, the vehicle start running control means 122 sequentially detects the input shaft rotation speed Nin of the manual transmission 16 based on the signal from the input shaft rotation speed sensor 88 and sequentially determines whether the input shaft rotation speed Nim becomes equal to or greater than a predetermined engine start rotation speed Nste. If the input shaft rotation speed Nin becomes equal to or greater than the engine start rotation speed Nste as a result of the determination, the running state of the vehicle 8 is switched from the EV running to the HV running. For making the switch, the vehicle start running control means 122 provides the engine start control for starting the engine 12 during the EV running. Specifically, in the engine start control, the vehicle start running control means 122 provides feedback control such that the release cylinder stroke amount STKrc detected by the stroke position sensor 90 changes in the direction of engaging the clutch 14 at a predetermined engine starting time change rate R1stkrc, thereby causing the shut valve control means 114 to progressively increase the shut valve opening degree OPsht. As the shut valve opening degree OPsht is increased in this way, the oil in the clutch release cylinder 64 more easily returns toward the clutch master cylinder 76 and the reduction in the release cylinder oil pressure Prc is facilitated. When the progressive increase in the shut valve opening degree OPsht puts the clutch 14 into the slip state, the engine 12 is cranked by the reverse drive power transmitted from the drive wheels 46 and the engine rotation speed Ne is raised. In this case, the vehicle start running control means 122 may cause the electric motor MG to output an assist torque assisting the cranking of the engine 12 so as not to give an uncomfortable feeling to a driver due to a rotational resistance (friction) of the engine 12 acting as a running load. For example, the engine starting time change rate R1stkrc is empirically determined in advance so as to continue the slip state (half-clutch state) of the clutch 14 such that the engine can be started with a shock suppressed and to rapidly start the engine. The engine start rotation speed Nste is a threshold value for determining the end of the EV running and is empirically determined in advance so as to satisfy both a fuel efficiency performance and a running performance of the vehicle 8.

The vehicle start running control means 122 sequentially detects the engine rotation speed Ne during provision of the engine start control and sequentially determines whether the engine rotation speed Ne becomes equal to or greater than a stall rotation speed Nest1. If the engine rotation speed Ne is raised by the progressive increase in the shut valve opening degree OPsht and the engine rotation speed Ne becomes equal to or greater than the stall rotation speed Nest1, the vehicle start running control means 122 causes the output control device 13 to inject and ignite fuel, thereby starting the engine 12. The stall rotation speed Nest1 is a lower limit rotation speed enabling the self-sustaining rotation of the engine 12 and is empirically determined in advance such that the engine can certainly be started in lower rotation. If the start of the engine 12 is completed, the vehicle start running control means 122 instructs the shut valve control means 114 to completely open the shut valve 80. In other words, the shut valve opening degree OPsht is set to 100%. Since the engine is started in the engine start control as described above, it can be said that the vehicle start running control means 122 opens the shut valve 80 such that the clutch 14 is allowed to slip when the engine 12 is started during the EV running.

As described above, if the charge state determining means 120 determines that the charge remaining amount SOC is less than the charge remaining amount lower limit value LOsoc, the vehicle start running control means 122 performs the HV running after the engine start and, if the HV running is performed, the clutch 14 must be engaged at the start of the vehicle so as to transmit the power of the engine 12 to the drive wheels 46. Therefore, the vehicle start running control means 122 provides starting time clutch engagement control for engaging the clutch 14 at the start of the vehicle. Specifically, in the starting time clutch engagement control, the vehicle start running control means 122 provides feedback control such that the release cylinder stroke amount STKrc changes in the direction of engaging the clutch 14 at a predetermined HV running starting time change rate R2stkrc, thereby causing the shut valve control means 114 to progressively increase the shut valve opening degree OPsht. If the input side and the output side of the clutch 14 synchronize with each other, the vehicle start running control means 122 instructs the shut valve control means 114 to completely open the shut valve 80. In other words, the shut valve opening degree OPsht is set to 100%. The HV running starting time change rate R2stkrc is empirically determined in advance so as to suppress a shock and to promptly engage the clutch 14. The input side and the output side of the clutch 14 synchronize with each other, for example, when a rotation speed difference between the engine rotation speed Ne and the input shaft rotation speed Nin of the manual transmission 16 becomes equal to or less than a clutch rotation speed difference empirically determined in advance so as to certainly determine the synchronization of the clutch 14 with a detection error excluded. Since the engine 12 is started earlier than the start of the starting time clutch engagement control, the engine 12 has the throttle valve opening degree θth controlled depending on the accelerator opening degree Acc and outputs the engine torque Te corresponding to the accelerator opening degree Acc even during the provision of the starting time clutch engagement control.

As described above, the electronic control device 84 of this example performs the EV running and switches the running state of the vehicle 8 from the EV running to the HV running.

Figure 5:
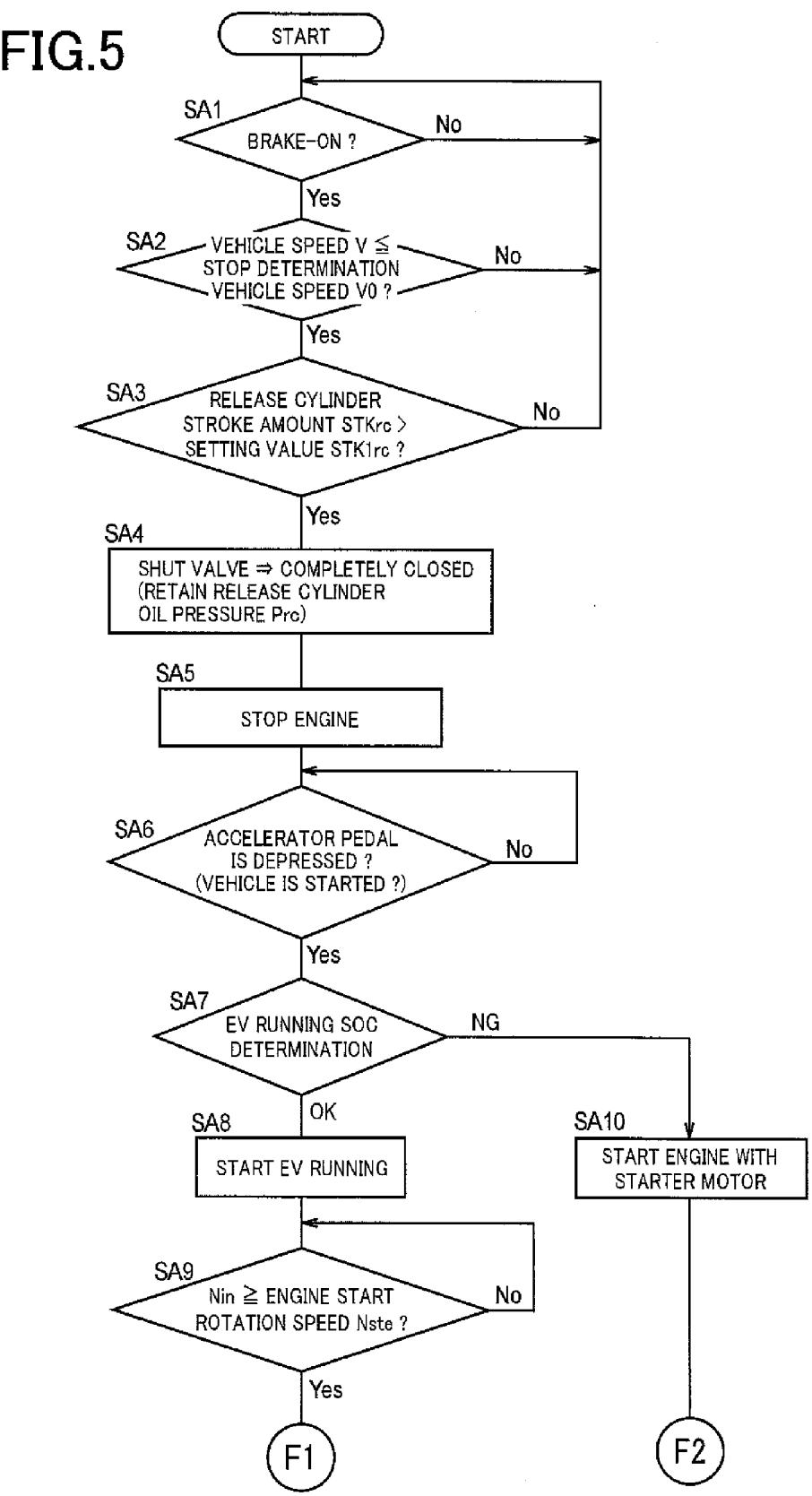
FIG. 5 is a first one of a set of flowcharts for explaining a main portion of a control operation of the electronic control device of FIG. 2, i.e., the control operation of stopping the engine when the vehicle stops and switching the vehicle running state from the EV running to the HV running after the start of the vehicle.
Figure 6:
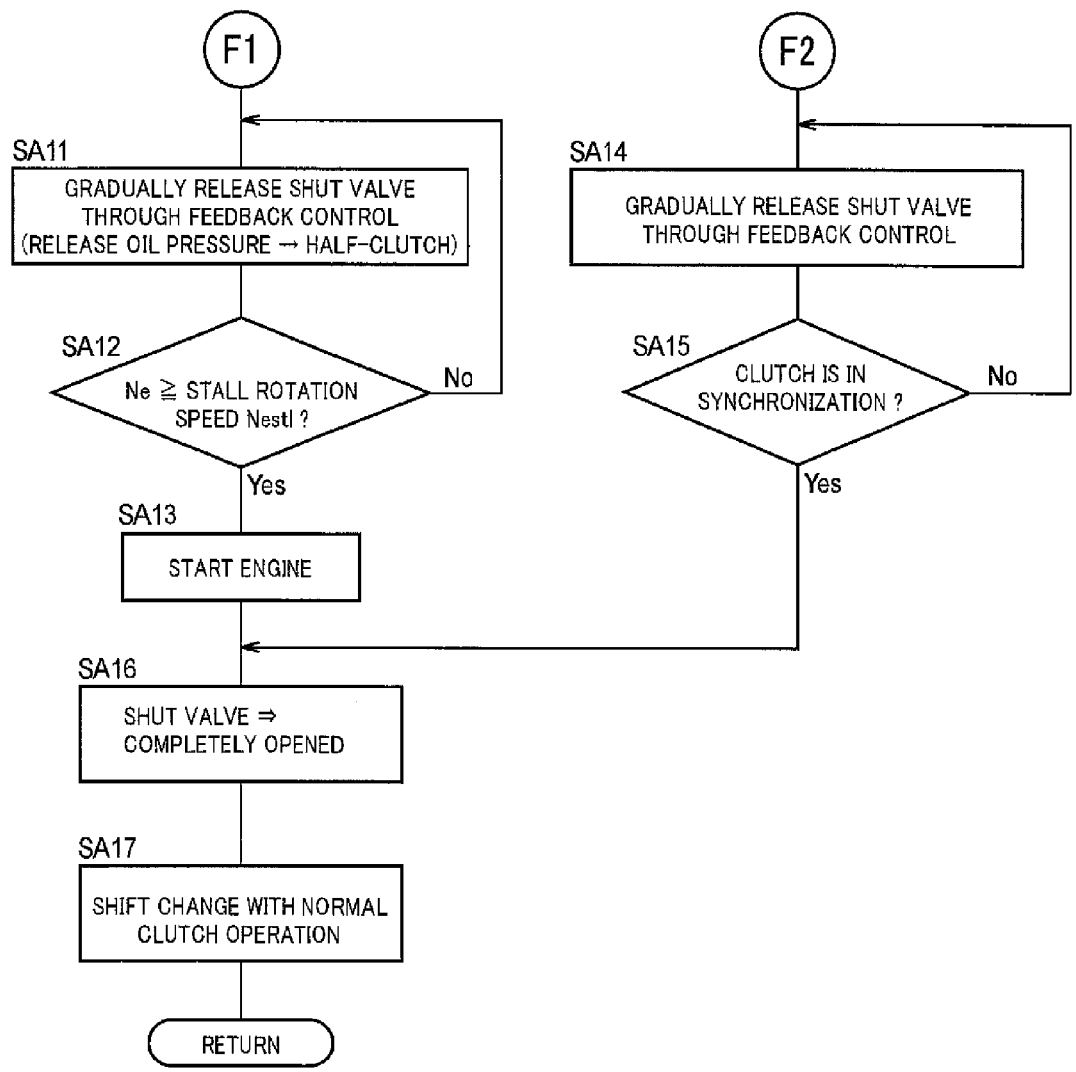
FIG. 6 is a second one of the flowcharts for explaining a main portion of a control operation of the electronic control device 84, i.e., the control operation of stopping the engine 12 when the vehicle stops and switching the vehicle running state from the EV running to the HV running after the start of the vehicle.

FIGS. 5 and 6 are flowcharts for explaining a main portion of a control operation of the electronic control device 84, i.e., the control operation of stopping the engine 12 when the vehicle stops and switching the vehicle running state from the EV running to the HV running after the start of the vehicle, and are repeatedly executed with an extremely short cycle time, for example, on the order of a few msec to a few tens of msec. The control operations depicted in FIGS. 5 and 6 are performed independently or concurrently with another control operation. When the flowcharts depicted in FIGS. 5 and 6 are started, the engine 12 is being driven and the shut valve 80 is completely opened.

At step (hereinafter, "step" will be omitted) SA1 of FIG. 5, it is determined whether the operation state of the foot brake pedal 99 is the brake-on. If the determination of SA1 is affirmative, i.e., if the operation state of the foot brake pedal 99 is the brake-on, the operation goes to SA2. On the other hand, if the determination of SA1 is negative, the determination of SA1 is repeated.

At SA2, it is determined whether the vehicle speed V is equal to or less than the stop determination vehicle speed V0. If the determination of SA2 is affirmative, i.e., if the vehicle speed V is equal to or less than the stop determination vehicle speed V0, the operation goes to SA3. On the other hand, if the determination of SA2 is negative, the operation goes to SA1. SA1 and SA2 correspond to the stop determining means 110.

At SA3 corresponding to the clutch release state determining means 112, it is determined whether the clutch 14 is completely released. Specifically, it is determined whether the release cylinder stroke amount STKrc exceeds the stroke amount determination value STK1rc that is a predetermined setting value. Since the shut valve 80 is completely opened at the time of determination of SA3, the clutch 14 is released when a driver depresses the clutch pedal 70. If the determination of SA3 is affirmative, i.e., if the release cylinder stroke amount STKrc exceeds the stroke amount determination value STK1rc, the operation goes to SA4. On the other hand, if the determination of SA3 is negative, the operation goes to SAL At SA4 corresponding to the shut valve control means 114, the shut valve 80 is switched from the opened state to the closed state. Therefore, the shut valve 80 is closed. As a result, the release cylinder oil pressure Pre completely releasing the clutch 14 is retained and the completely released state of the clutch 14 is maintained even if the driver cancels the depressing operation of the clutch pedal 70. When the shut valve 80 is closed at SA4, the operation goes to SA5.

At SA5 corresponding to the engine stopping means 116, the engine 12 is stopped. When the engine 12 is stopped at SA5, the operation goes to SA6.

At SA6 corresponding to the vehicle start determining means 118, it is determined whether the start operation of the vehicle 8 is performed, i.e., whether the accelerator pedal 95 is depressed. If the determination of SA6 is affirmative, i.e., if the accelerator pedal 95 is depressed, the operation goes to SA7. On the other hand, if the determination of SA6 is negative, the determination of SA6 is repeated. If a driver depresses the accelerator pedal 95, it is considered that the driver shifts the manual transmission 16 to the shift stage suitable for starting the vehicle, for example, the first shift stage, before depressing the accelerator pedal 95.

At SA7 corresponding to the charge state determining means 120, it is determined whether the charge remaining amount SOC of the electric storage device 48 is less than the charge remaining amount lower limit value LOsoc. In other words, an EV running SOC determination is made to determine whether the charge remaining amount SOC is sufficient for performing the EV running. If the charge remaining amount SOC is less than the charge remaining amount lower limit value LOsoc, the determination result of the EV running SOC determination is NG and, if the charge remaining amount SOC is equal to or greater than the charge remaining amount lower limit value LOsoc, the determination result is OK. If the determination of SA7 is affirmative, i.e., if the charge remaining amount SOC is less than the charge remaining amount lower limit value LOsoc, the operation goes to SA10. On the other hand, if the determination of SA7 is negative, i.e., if the charge remaining amount SOC is equal to or greater than the charge remaining amount lower limit value LOsoc, the operation goes to SA8.

At SA8 corresponding to the vehicle start running control means 122, the EV running is started. In this case, since the completely released state of the clutch 14 is maintained because the shut valve 80 is closed at SA4, the engine 12 is disconnected from the transmission input shaft 24 and the EV running can be performed. In the EV running, the electric motor torque Tmg corresponding to the accelerator opening degree Acc is transmitted to the transmission input shaft 24. When the EV running is started at SA8, the operation goes to SA9.

At SA9 corresponding to the vehicle start running control means 122, it is determined whether the input shaft rotation speed Nin of the manual transmission 16 becomes equal to or greater than the engine start rotation speed Nste. If the determination of SA9 is affirmative, i.e., if the input shaft rotation speed Nin becomes equal to or greater than the engine start rotation speed Nste, the operation goes to SA11 of FIG. 6. On the other hand, if the determination of SA9 is negative, the determination of SA9 is repeated.

At SA10 corresponding to the vehicle start running control means 122, the engine 12 is cranked by the starter motor 51 and the engine 12 is started. After the start of the engine, the HV running is performed depending on the accelerator opening degree Acc. When the engine 12 is started at SA10, the operation goes to SA14 of FIG. 6.

At SA11 of FIG. 6, the shut valve 80 is gradually released. Specifically, the shut valve opening degree OPsht is progressively increased such that the release cylinder stroke amount STKrc changes in the direction of engaging the clutch 14 at the engine starting time change rate R1stkrc. The control of progressively increasing the shut valve opening degree OPsht is preferably provided through the feedback control in which the release cylinder stroke amount STKrc is sequentially detected. When the clutch 14 is put into the slip state (half-clutch state) due to the progressive increase of the shut valve opening degree OPsht, the engine 12 is cranked by the reverse drive power transmitted from the drive wheels 46 and the engine rotation speed Ne is raised. When the progressive increase of the shut valve opening degree OPsht is started at SA11, the operation goes to SA12. SA11 corresponds to the vehicle start running control means 122 and the shut valve control means 114.

At SA12 corresponding to the vehicle start running control means 122, it is determined whether the engine rotation speed Ne becomes equal to or greater than the stall rotation speed Nest1. If the determination of SA12 is affirmative, i.e., if the engine rotation speed Ne becomes equal to or greater than the stall rotation speed Nest1, the operation goes to SA13. On the other hand, if the determination of SA12 is negative, the operation goes to SA11.

At SA13 corresponding to the vehicle start running control means 122, the engine 12 is started. When the engine 12 is started at SA13, the operation goes to SA16.

At SA14, the shut valve 80 is gradually released. Specifically, the shut valve opening degree OPsht is progressively increased such that the release cylinder stroke amount STKrc changes in the direction of engaging the clutch 14 at the HV running starting time change rate R2stkrc. The control of progressively increasing the shut valve opening degree OPsht is preferably provided through the feedback control in which the release cylinder stroke amount STKrc is sequentially detected. When the progressive increase of the shut valve opening degree OPsht is started at SA14, the operation goes to SA15. SA14 corresponds to the vehicle start running control means 122 and the shut valve control means 114. Since the engine 12 is started at SA10, the engine 12 is being driven at the time of control of SA14 unlike SA11.

At SA15 corresponding to the vehicle start running control means 122, it is determined whether the rotation speed of the input side and the rotation speed of the output side of the clutch 14 synchronize with each other. If the determination of SA15 is affirmative, i.e., if the rotation speed of the input side and the rotation speed of the output side of the clutch 14 synchronize with each other, the operation goes to SA16. On the other hand, if the determination of SA15 is negative, the operation goes to SA14.

At SA16, the shut valve 80 is put into the completely opened state. In other words, the shut valve opening degree OPsht is set to 100%. As a result of execution of SA16, the progressive increase of the shut valve opening degree OPsht started at SA11 or SA14 is terminated. When the shut valve opening degree OPsht is set to 100% at SA16, the operation goes to SA17. SA16 corresponds to the vehicle start running control means 122 and the shut valve control means 114.

At SA17, since the shut valve opening degree OPsht is set to 100% at SA16, a normal clutch operation can be performed in which the clutch 14 mechanically responds to, and is released by, the depressing operation of the clutch pedal 70, and a shift change (gear change) of the manual transmission 16 is performed with the normal clutch operation. Since the shut valve opening degree OPsht is set to 100% at SA16, the shut valve opening degree OPsht of 100% subsequently continues until the flowcharts are executed again and the shut valve 80 is closed at SA4.

According to this example, if the clutch 14 is released by the depressing operation of the clutch pedal 70 during driving of the engine 12, the electronic control device 84 closes the shut valve 80 making up a portion of the hydraulic path between the clutch master cylinder 76 and the clutch release cylinder 64. Therefore, the closing of the shut valve 80 retains the oil pressure Prc in the clutch release cylinder 64 supplied by the depressing operation of the clutch pedal 70 even when the depressing operation of the clutch pedal 70 is canceled and, thus, the electronic control device 84 can retain the release state of the clutch 14 and can automatically stop the engine 12. Therefore, after the automatic stop of the engine 12, the EV running can be performed by using the power of the electric motor MG for running with the engine 12 stopped. Since the release cylinder oil pressure Prc retaining the release state of the clutch 14 at the time of closing of the shut valve 80 is supplied to the clutch release cylinder 64 by the depressing operation of the clutch pedal 70, it is advantageous that, for example, a hydraulic supply source including an oil pump etc., is not necessary for releasing the clutch 14.

According to this example, the electronic control device 84 opens the shut valve 80 to allow the clutch 14 to slip if the engine 12 is started during the EV running. Therefore, the electronic control device 84 can adjust the shut valve opening degree OPsht to appropriately transmit the power from the manual transmission 16 side to the engine 12 and can crank the engine 12 with the power from the manual transmission 16 side to start the engine. Therefore, the running state of the vehicle can be shifted from the EV running to the HV running.

According to this example, if the clutch 14 is released by the depressing operation of the clutch pedal 70 during driving of the engine 12, the electronic control device 84 closes the shut valve 80 when the vehicle 8 stops, and keeps the shut valve 80 open when the running of the vehicle 8 is continued. Therefore, when the running of the vehicle 8 is continued, the clutch 14 is released in conjunction with the depressing operation of the clutch pedal 70 and, therefore, a driver can perform a manual shift operation of the manual transmission 16 accompanied by the depressing operation of the clutch pedal 70.

According to this example, the electronic control device 84 stops the engine 12 if the shut valve 80 is closed. If the depressing operation of the accelerator pedal 70 is performed during stop of the engine 12, the EV running is performed with the stopped state of the engine 12 maintained. Therefore, the EV running is performed at the start of the vehicle and, thus, the fuel efficiency of the vehicle 8 is improved.

According to this example, as depicted in FIG. 3, the clutch master cylinder 76 generates an oil pressure when the piston 77 is pressed in the axial direction by the pushrod 75 interposed between the piston 77 included in the clutch master cylinder 76 and the clutch pedal 70. The pushrod 75 is disposed to be movable relative to the piston 77 from the position of pressing the piston 77, to the side away from the piston 77. The clutch pedal 70 is biased in the return direction of the clutch pedal 70. Therefore, even when the shut valve 80 is closed with the clutch 14 released and, as a result, the piston 77 of the clutch master cylinder 76 is retained at the position when the clutch pedal 70 is subjected to the depressing operation, the clutch pedal 70 returns to the position before the depression (pedal initial position) if a driver stops the depressing operation of the clutch pedal 70. Therefore, an uncomfortable feeling given to the driver can be avoided such as those generated when the clutch pedal 70 does not return to the pedal initial position before the depression due to the closing of the shut valve 80.

Although the example of the present invention has been described in detail with reference to the drawings, the example merely represents an embodiment and the present invention can be implemented in variously modified and improved forms based on the knowledge of those skilled in the art.

For example, although the manual transmission 16 is the parallel-shaft-type constant-mesh shifting mechanism in the example, a type thereof is not particularly limited as long as the manual transmission 16 is a manual transmission having a gear changed when the clutch 14 is released.

Although the shut valve 80 is gradually opened and it is determined whether the rotation speed of the input side and the rotation speed of the output side of the clutch 14 synchronize with each other at SA14 and SA15 of the flowchart of FIG. 6 in the example, the shut valve 80 may gradually be opened at a predetermined change rate to the extent that a shock of opening the shut valve 80 can be suppressed without determining whether the clutch 14 is in synchronization. This is because, since a driver gradually reduces the depression amount of the clutch pedal 70 from the maximum depression amount along with the depressing operation of the accelerator pedal 95 at the start of the vehicle, the opened state of the shut valve 80 allows the driver to engage the clutch 14 in accordance with the operation of reducing the depression amount of the clutch pedal 70.

Although it is determined that the clutch 14 is completely released if the release cylinder stroke amount STKrc exceeds the stroke amount determination value STK1rc at SA3 of the flowchart of FIG. 5 in the example, whether the clutch 14 is completely released may be determined based on the release cylinder oil pressure Prc instead of the release cylinder stroke amount STKrc. This is because the clutch 14 is more released as the release cylinder oil pressure Prc becomes larger. For example, it is determined whether the release cylinder oil pressure Prc exceeds a predetermined oil pressure determination value and, if the release cylinder oil pressure Prc exceeds the oil pressure determination value, it may be determined that the clutch 14 is completely released. The oil pressure determination value is empirically determined in advance such that the completely released state of the clutch 14 can be determined based on the release cylinder oil pressure Prc. Since the shut valve 80 is completely opened at the time of determination of SA3, the master cylinder oil pressure Pmc detected by the master cylinder oil pressure sensor 92 may be used instead of the release cylinder oil pressure Prc.

Figure 7:
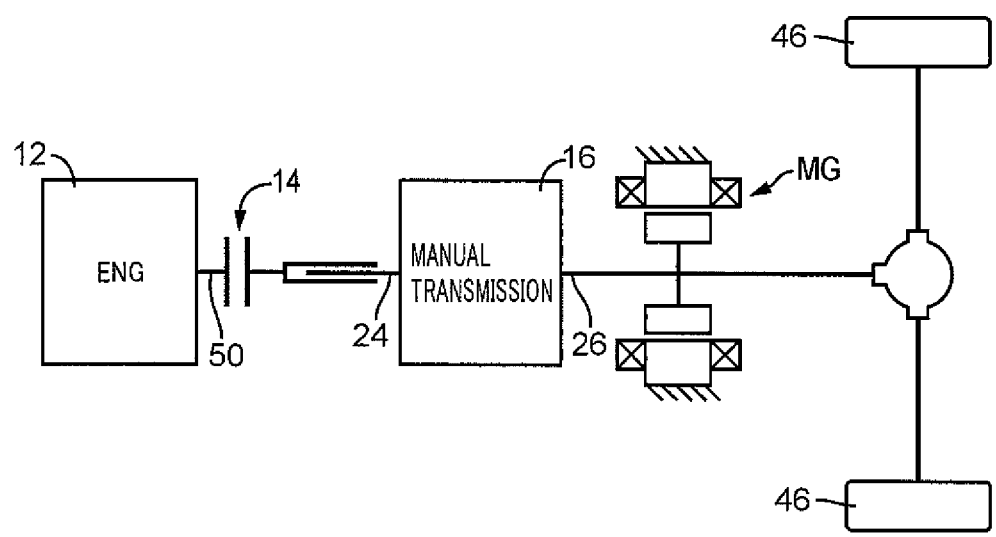
FIG. 7 is a diagram schematically illustrating a vehicle drive device different from the vehicle drive device of FIG. 1 to which the present invention is preferably applied, wherein the engine, the clutch, the manual transmission, the electric motor, and the drive wheels are coupled in this order in the power transmission path from the engine to the drive wheels.

Although the electric motor MG is coupled to the transmission input shaft 24 in the power transmission path from the engine 12 to the drive wheels 46 in FIG. 1 of the example, the electric motor MG may be coupled between the transmission output shaft 26 and the drive wheels 46 as depicted in FIG. 7, for example. In other words, the engine 12, the clutch 14, the manual transmission 16, the electric motor MG, and the drive wheels 46 may be coupled in this order.

Although the power of the engine 12 and the power of the electric motor MG are transmitted to the common drive wheels 46 in FIG. 1 of the example, these powers may be transmitted to respective different drive wheels. For example, while the drive wheels 46 of FIG. 1 receiving the transmission of the power of the engine 12 are front wheels, the electric motor MG may not be provided in FIG. 1 and the vehicle 8 may be configured with the electric motor MG coupled to rear wheels rather than the front wheels such that the power of the electric motor MG is transmitted to the rear wheels.

Although the shut valve 80 is closed at SA4 and the engine 12 is stopped at SA5 when the vehicle stops in the flowcharts of FIGS. 5 and 6 in the example, the shut valve 80 is closed and the engine 12 is stopped not only when the vehicle stops. For example, if the clutch pedal 70 is depressed by a driver during the HV running and an EV switch operated for performing the EV running is turned on by the driver along with the depressing operation of the clutch pedal 70, the shut valve 80 may be closed and the engine 12 may be stopped. In this case, the HV running can be switched to the EV running by intention of the driver. Alternatively, if the clutch pedal 70 is depressed by a driver during driving of the engine 12 and the manual transmission 16 is concurrently shifted to the reverse shift stage, the shut valve 80 may be closed and the engine 12 may be stopped. In short, the electronic control device 84 may close the shut valve 80 if a predetermined condition is satisfied when the clutch 14 is released by the depressing operation of the clutch pedal 70 during driving of the engine 12.

Although the stop determining means 110 determines that the vehicle 8 is to be stopped if the operation state of the foot brake pedal 99 is the brake-on and the vehicle speed V is equal to or less than the stop determination vehicle speed V0 in the example, whether the vehicle 8 is to be stopped may be determined by using another condition. For example, the stop determining means 110 may determine that the vehicle 8 is to be stopped if the vehicle speed V is equal to or less than the stop determination vehicle speed V0 and the vehicle speed V is decreasing regardless of the operation state of the foot brake pedal 99.

Although it is determined whether the EV running is switched to the HV running at SA9 based on the input shaft rotation speed Nin in the flowcharts of FIGS. 5 and 6 in the example, the determination may be made based on another parameter such as the output of the electric motor MG and the vehicle speed V.

Although SA7, SA10, SA14, and SA15 are included in the flowcharts of FIGS. 5 and 6 in the example, these steps may not be included and the operation may go to SA8 if the determination of SA6 is affirmative.

Although the vehicle 8 is described as a front-wheel drive type (FF type) in FIG. 1 in the example, the vehicle 8 may be a hybrid vehicle of a rear-wheel drive type (FR type) or a four-wheel drive type.

The shift operation of the manual transmission 16 may be performed by a driver during the EV running in the example. For example, if the shift operation of the manual transmission 16 is performed during the EV running, the operation position of the clutch pedal 70 is sequentially detected, and the electric motor torque Tmg is set to zero in accordance with the depressing operation of the clutch pedal 70 so as to interrupt the torque input to the transmission input shaft 24 at the time of the shift operation.

NOMENCLATURE OF ELEMENTS

8: hybrid vehicle
10: vehicle drive device
12: engine
14: clutch
16: manual transmission
64: clutch release cylinder (release cylinder)
70: clutch pedal
75: pushrod (piston pressing member)
76: clutch master cylinder (master cylinder)
77: piston
80: shut valve
84: electronic control device (control device)
95: accelerator pedal
MG: electric motor

The invention claimed is:

1. A control device of a vehicle drive device having an engine that is a drive power source for running, a manual transmission receiving power of the engine via a clutch, an electric motor acting as a drive power source for running disposed on the downstream side of the clutch, a release cylinder releasing the clutch depending on a supply oil pressure, and a master cylinder supplying an oil pressure to the release cylinder in accordance with a depressing operation of a clutch pedal,
   a shut valve being disposed that is put into a closed state to interrupt a hydraulic path between the release cylinder and the master cylinder, and
   the shut valve being closed if the clutch is released by the depressing operation of the clutch pedal during driving of the engine.

2. The control device of a vehicle drive device of claim 1, wherein
   during EV running in which power of the electric motor is used for running with the engine stopped, if the engine is started, the shut valve is opened to allow the clutch to slip.

3. The control device of a vehicle drive device of claim 1, wherein
   if the clutch is released by the depressing operation of the clutch pedal during driving of the engine, the shut valve is closed when a vehicle stops, while the shut valve is kept open when the running of the vehicle is continued.

4. The control device of a vehicle drive device of claim 1, wherein
   if the shut valve is closed, the engine is stopped, and wherein
   if a depressing operation of an accelerator pedal is performed during stop of the engine, the EV running is performed in which power of the electric motor is used for running with the engine stopped.

5. The control device of a vehicle drive device of claim 1, wherein
   the master cylinder generates an oil pressure when a piston pressing member interposed between a piston included in the master cylinder and the clutch pedal presses 10 the piston in an axial direction, wherein
   the piston pressing member is disposed to be movable relative to the piston from a position of pressing the piston, to a side away from the piston, and wherein
   the clutch pedal is biased in a return direction of the clutch pedal.

\* \* \* \* \*